United States Patent [19]
Beck

[11] 3,958,172
[45] May 18, 1976

[54] FREQUENCY REDUCTION AND POWER CONTROL CIRCUIT FOR THYRISTOR LINE CONTROLLERS

[75] Inventor: William H. Beck, Palos Verdes, Calif.

[73] Assignee: The Garrett Corporation, Los Angeles, Calif.

[22] Filed: Oct. 18, 1974

[21] Appl. No.: 516,233

[52] U.S. Cl. .................................. 321/16; 321/61; 307/252 UA; 323/22 SC; 323/24
[51] Int. Cl.² ........................................ H02M 5/27
[58] Field of Search ............. 323/16, 18, 22 SC, 24, 323/34; 321/16, 18, 61; 307/252 UA

[56] References Cited
UNITED STATES PATENTS

| | | | |
|---|---|---|---|
| 3,493,838 | 2/1970 | Gyugyi et al. | 321/61 X |
| 3,541,429 | 11/1970 | Martin | 323/16 |
| 3,562,625 | 2/1971 | van den Broek | 321/16 |
| 3,691,452 | 9/1972 | Aguiar | 323/24 X |

Primary Examiner—Gerald Goldberg
Attorney, Agent, or Firm—Joel D. Talcott; Albert J. Miller

[57] ABSTRACT

A circuit for a thyristor line controller interconnecting an alternating current voltage generating power source to a load that controls the amount of power delivered to the load and reduces the fundamental frequency component to $f/n$, where $f$ is the frequency of generated voltage, and $n$ is an integral number.

14 Claims, 4 Drawing Figures

FREQUENCY REDUCTION AND POWER CONTROL CIRCUIT FOR THYRISTOR LINE CONTROLLERS

BACKGROUND OF THE INVENTION

This invention relates generally to power control circuits, and more particularly to circuits for controlling the amount and fundamental frequency component of electrical power delivered to loads.

The increasing power capability of thyristor devices has led to significant changes in the techniques of power conversion and control. In particular, the thyristor has been widely used in apparatus which serves as a power controller between conventional utility power sources and loads which require variable voltage and frequency inputs. One such prior application of a power controller involves the use of back-to-back thyristors between a single phase AC power source and a load. By properly phasing the thyristor gate drive with respect to the input voltage waveform, control can be established over the amount of source voltage that is permitted to reach the load. Such controllers can be used with motor starters, light dimmers, variable speed apparatus control, electric heating, and similar applications. The basic single phase power controller can be modified to control three phase power sources and loads. In three phase applications, six thyristors are used, a back-to-back pair in each power line.

Both the prior single phase and three phase thyristor power controllers are controlled to produce load power at the same frequency as the input voltage. This feature limits the usefulness of the thyristor control technique when the load is a three-phase induction motor, for example. Increased torque and reduced rotor heating of the motor could be achieved at low speeds if the fundamental frequency component of the voltage applied to such a motor were reduced. The approach usually used for direct frequency reduction to gain such advantages is to provide the use of a conventional thyristor cycloconverter, but this approach generally requires 12 thyristors in addition to the six required for three phase control, increasing cost and complexity of the circuits.

SUMMARY OF THE INVENTION

In accordance with the present invention, a control circuit is provided for a thyristor line controller which achieves predetermined fundamental frequency reduction of power supplied to a load without an increase in the number of thyristors employed by the controller.

In the preferred embodiment of the circuit of this invention for a thyristor line controller interconnecting a voltage generating power source to a load there is provided means which generates synchronizing signals, and means which generates trigger signals to actuate the thyristors to control the amount and the fundamental frequency component of alternating current electrical power delivered to the load to $f/n$, where $f$ is the frequency of the generated voltage and $n$ is an integral number.

It will be seen that the power control circuit of this invention is capable of providing loads with controlled power of reduced fundamental frequency from fixed frequency alternating current power sources, and is less complex as compared with prior power controllers.

BRIEF DESCRIPTION OF THE DRAWINGS

For a more complete understanding of the invention, reference may be had to the accompanying drawings in which.

DETAILED DESCRIPTION OF THE PREFERRED EMBODIMENT

Figure 1:
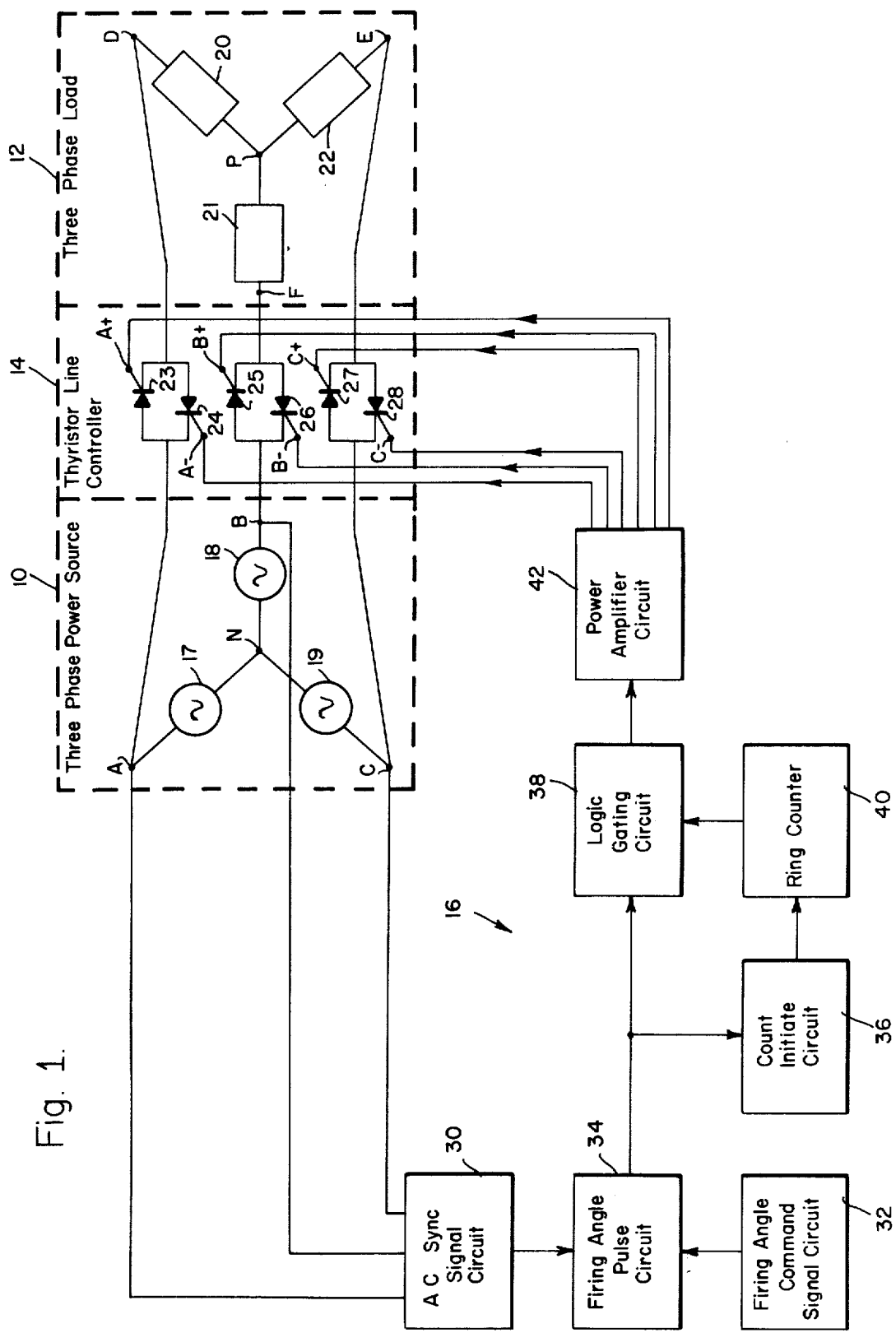
FIG. 1 is a partly schematic block diagram illustration of the apparatus incorporating the control circuit of the present invention.

Referring now to FIG. 1, numeral 10 designates a power supply connected to a load 12 by means of a thyristor line controller 14 which is provided with a control circuit generally designated by the numeral 16 and connected thereto.

Figure 3:
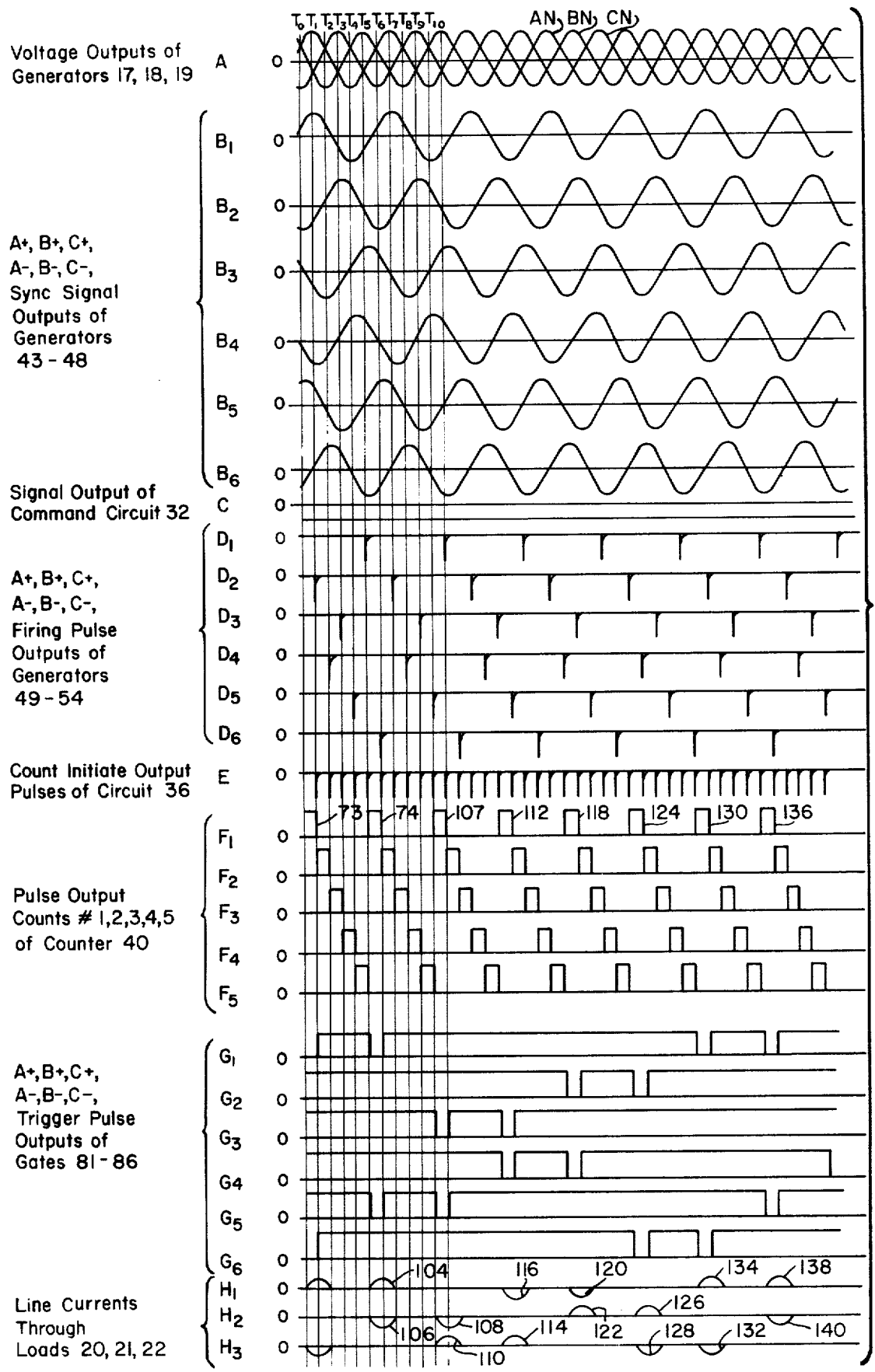
FIGS. 3A, $3B_1$–$3B_6$, 3C, $3D_1$–$3D_6$, 3E, $3F_1$–$3F_5$, $3G_1$–$3G_6$, and $3H_1$–$3H_3$ are waveforms helpful in the understanding of the operation of the circuits of FIGS. 1 and 2.

Power supply 10 is a three-phase power source consisting of separate alternating current generators 17, 18, 19, connected to a common terminal N and output terminals A, B, and C, respectively. Voltage outputs AN, BN, and CN are generally of sinusoidal shape as shown in FIG. 3A.

Load 12 is a three-phase load and can consist of separate inductive loads 20, 21, 22, for example, connected to a common terminal P and input terminals D, E, and F, respectively.

Line controller 14 consists of a plurality of thyristors 23–28, with the thyristors of the pairs 23 and 24, 25 and 26, and 27 and 28 connected back-to-back, and across the terminals AD, BF, and CE, respectively.

Thyristors 23–28 are arranged to conduct current from terminals A to D, D to A, B to F, F to B, C to E, and E to C when actuated at their respective terminals $A^+$, $A^-$, $B^+$, $B^-$, $C^+$ and $C^-$.

Control circuit 16 generally consists of AC synchronizer signal circuit 30 and a firing angle command signal circuit 32 whose outputs are fed to the firing angle pulse circuit 34. The output from circuit 34 is fed both to a count initiate circuit 36 and logic gating circuit 38. The output from count initiate circuit 36 is applied to a ring counter 40 whose output is applied to the logic gating circuits 38. The output of the logic gating circuit is applied through the power amplifier circuit 42 to the individual control terminals $A^+$, $A^-$, $B^+$, $B^-$, $C^+$ and $C^-$ of thyristors 23–28, respectively.

Figure 2:
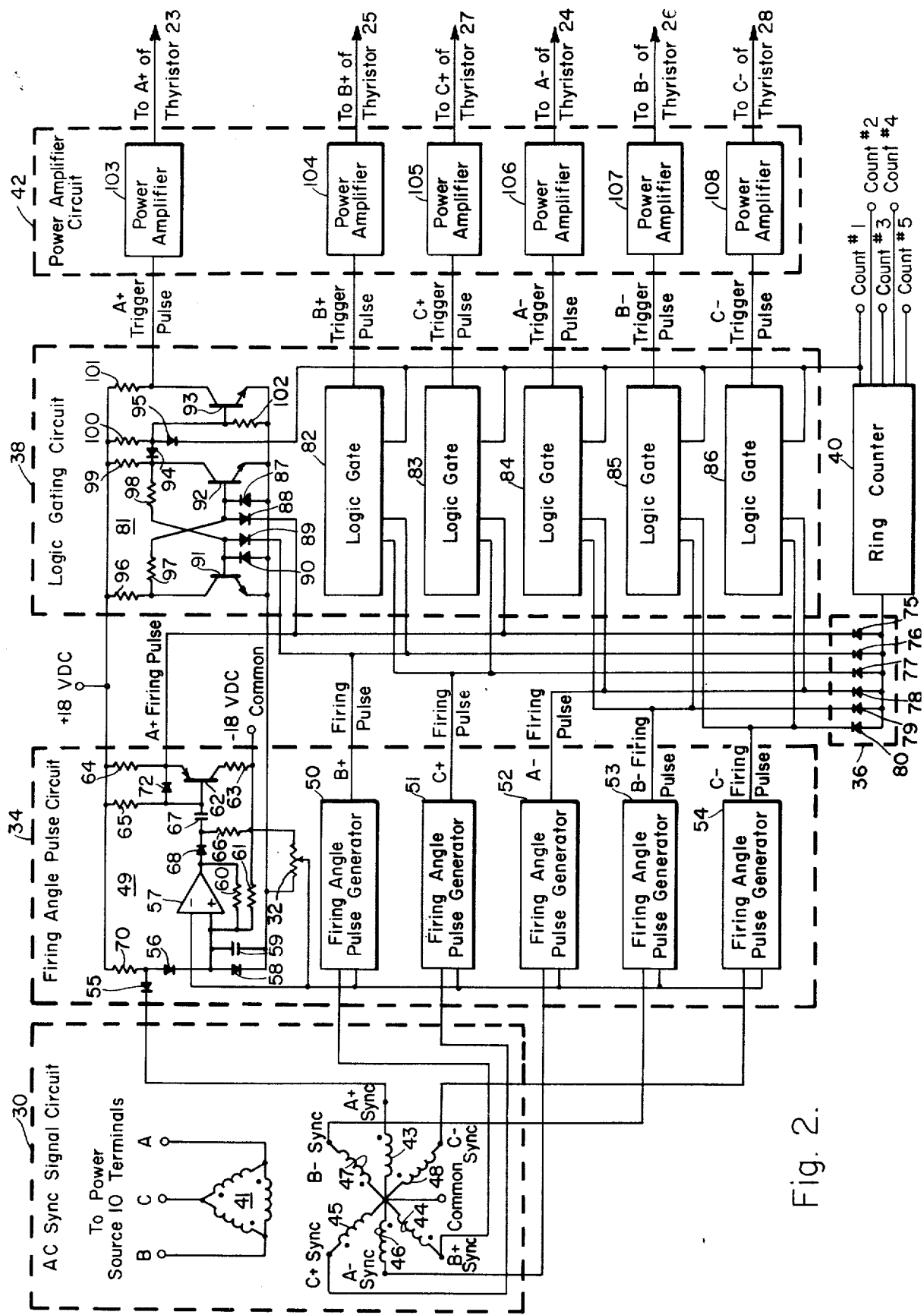
FIG. 2 is a partly schematic block diagram illustration of the details of the control circuit of FIG. 1.

Reference is now made to FIG. 2 wherein there is illustrated the details of the preferred circuit which may comprise the control circuit 16. In FIG. 2 of the control circuit 16, the AC synchronizing signal circuit 30 consists of a conventional three-phase multi-winding transformer whose primary winding arrangement 41 is energized from the three-phase power source 10 and whose secondary windings 43–48 are capable of generating the sinusoidal $A^+$, $B^+$, $C^+$, $A^-$, $B^-$, and $C^-$ synchronizing signal waveforms shown in FIGS. $3B_1$–$3B_6$, respectively. The outputs of windings 43–48 are so phased that the signals are electrically 60° apart, and the $C^-$, $B^+$, $A^-$, $C^+$ and $B^-$ signals lag the $A^+$ signal 60°, 120°, 180°, 240°, and 300°, respectively. The synchronizing signals illustrated in FIGS. $3B_1-3B_6$ each can have a frequency of, say, 60 Hz, for example.

The firing angle command signal circuit 32 can be any one of a number of conventional circuits which develop a normally negative DC potential output with respect to common, as shown in FIG. 3C. Circuit 32 can be a potentiometer connected between the negative power supply and common, as illustrated in FIG. 2. The movable wiper arm of the potentiometer 32 is connected in parallel to one of the inputs of each of the generators 49–54, as will hereafter be more fully described.

Firing angle pulse circuit 34 consists of a plurality of similar pulse generators 49-54 which generate the $A^+$, $B^+$, $C^+$, $A^-$, $B^-$, and $C^-$ firing pulses illustrated in FIGS. $3D_1 - 3D_6$, respectively. It should be noted, that merely for purposes of illustration, the $C^-$, $B^+$, $A^-$, $C^+$, $B^-$, and $A^+$ firing pulses are shown as being generated at times $T_0$, $T_1$, $T_2$, $T_3$, $T_4$, and $T_5$, respectively. At time $T_6$ the $C^-$ pulse is again generated, followed by a $B^+$ trigger pulse at $T_7$, and so forth. Since generators 49-54 are similarly constructed only the details of the generator 49 are illustrated and described.

Generator 49 consists of a diode 55 which interconnects output winding 43 of circuit 30 through diode 56 to the positive (+) input terminal of a differential amplifier 57. The negative (−) input terminal of amplifier 57 is connected to the movable arm of potentiometer 32 as well as to the corresponding negative (−) input terminals of the differential amplifiers of pulse generators 49-54. A parallel arrangement of a diode 58 and capacitor 59 interconnects the positive (+) terminal of amplifier 57 and common. A feed-back resistor 60 connects the positive (+) terminal of amplifier 57 with its output. A resistor 61 connects the negative terminal of a DC potential source to the positive (+) terminal of amplifier 57. A transistor 62 has its base connected through a capacitor 67 and a diode 68 to the output of amplifier 57. A resistor 66 connects between the capacitor 67 and diode 68 to the negative terminal of the DC source of potential. The resistor 63 connects the DC source negative terminal to the collector of transistor 62. The positive terminal of the DC potential source is connected through a resistor 64 to the emitter of transistor 62, a resistor 65 to the junction of capacitor 67 and the base of transistor 62, and a resistor 70 to the junction of diodes 55 and 56. A diode 72 interconnects the base and emitter of transistor 62.

Figure 4:
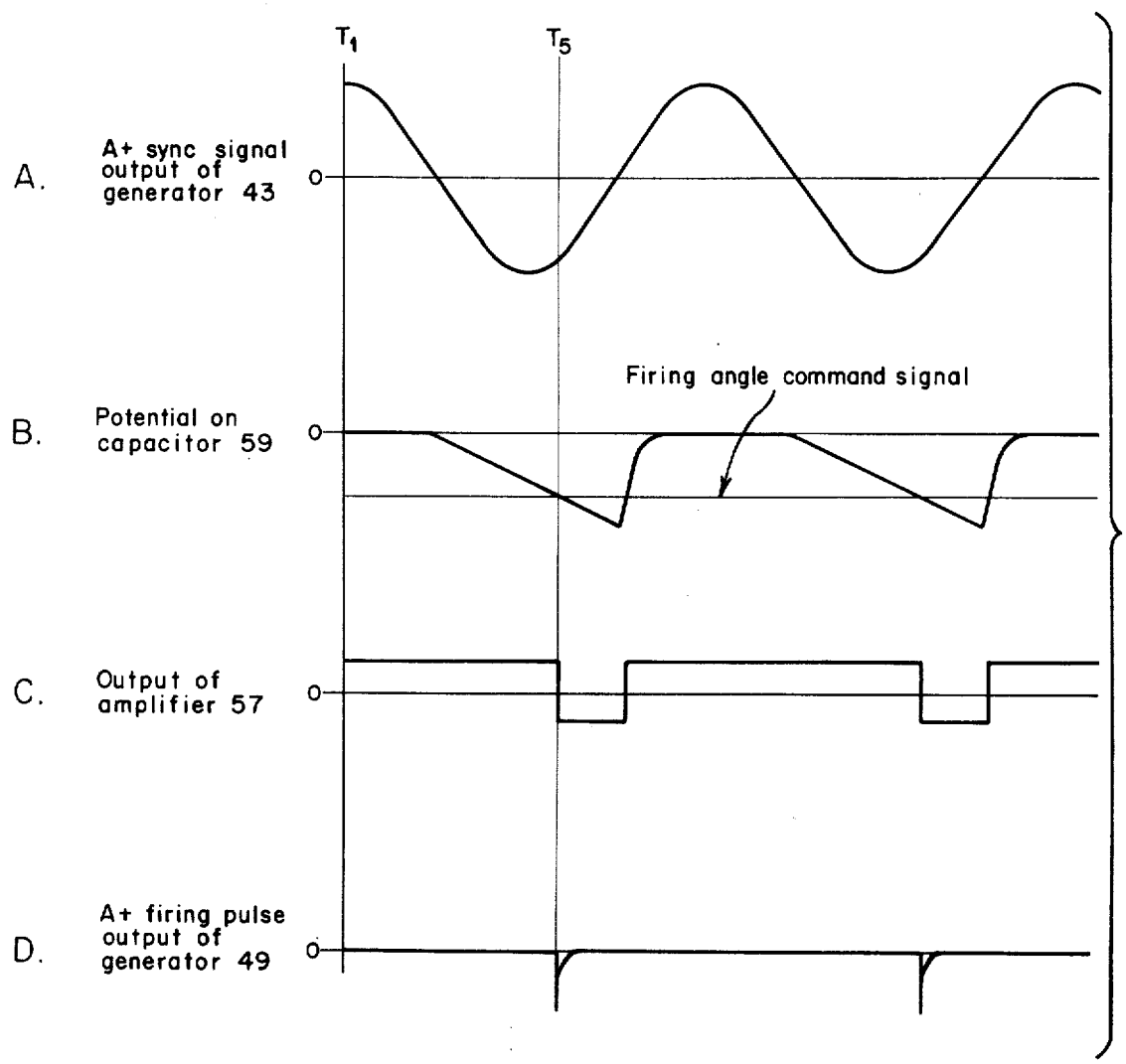
FIGS. 4A–4D are waveforms also helpful in the understanding of the invention.

Assume that the $A^+$ sync signal is at its maximum positive value at, say, $T_1$, as illustrated in FIG. $3B_1$ and FIG. 4A. Diode 55 is reverse biased and current from the power supply flows through resistor 70, diode 56 and diode 58. The positive (+) input terminal of amplifier 57 is thus held at a potential slightly above common and capacitor 59 is substantially discharged. When the $A^+$ sync signal decreases such that the current through resistor 70 is diverted through diode 55 and diode 56 is reverse biased, capacitor 59 charges through resistor 61 through the negative potential of the power supply, as illustrated in FIG. 4B. This action creates a negative going "ramp" at the positive (+) input terminal of amplifier 57. If it is assumed that the negative (−) input terminal of amplifier 57 initially has a negative firing angle command signal applied thereon by command signal circuit 32, the output of amplifier 57 is initially positive. However, at time $T_5$, when the positive (+) input terminal of amplifier 57 becomes lower in potential than the negative (−) input terminal, because of the decreasing "ramp," the output of amplifier 57 will switch to a negative value, as shown in FIG. 4C. This negative transition will reverse bias diode 68 permitting current to flow through resistor 64 and turn on transistor 62, generating the negative output $A^+$ firing pulse, illustrated in FIG. 3D and also in FIG. 4D. The pulse will exist until capacitor 67 is charged by the current through resistor 64. When full charge on capacitor 67 is achieved, transistor 62 turns off and circuit 49 remains in this state until the $A^+$ sync signal again becomes positive. When the positive half cycle of the $A^+$ sync signal is initiated, diode 55 will again be reverse biased and current will flow through resistor 70 and diode 56, thereby discharging capacitor 59 to substantially zero and causing the output of amplifier 57 to become positive. When the output of amplifier 57 becomes positive, capacitor 67 will be discharged through resistor 65 and diode 72 in preparation for the next cycle.

It will be appreciated that circuit 49 serves to produce the $A^+$ firing pulse in response to the $A^+$ sync signal and firing angle command signal. The $A^+$ firing pulse can be generated at various predetermined times during the negative 180° half cycle of the $A^+$ sync signal depending upon the magnitude of the negative potential of the firing angle command signal applied to the negative (−) terminal of amplifier 57. Thus, it will be also noted that the firing angle command circuit 32 can establish trigger pulse positions with respect to the output of the three phase power source 10, which will permit control of the amount of reduced frequency power delivered to the load 12. To increase the power applied to the load 12 through line controller 14, the firing angle command signal applied to the amplifiers 57 of the pulse generators 49–54 should be rendered less negative, and to decrease the output, the signal should become more negative. The maximum available output power controlled by controller 14 will be achieved when the firing angle command signal is equal to zero potential.

Count initiate circuit 36 consists of a plurality of diodes 75–80 connecting the firing angle pulse generators 49-54, to counter 40, respectively. The output of circuit 36 is a train of count initiate pulses which are formed in response to the $A^+$, $B^+$, $C^+$, $A^-$, $B^-$, and $C^-$ firing pulses generated by the generators 49–54, and are illustrated in FIG. 3E. The output of circuit 36 is applied as the input to counter 40.

Counter 40, which could be a conventional ring counter, is set to count a predetermined number of input count initiate pulses n from circuit 30, and then generate a single output pulse upon the occurrence of each nth count initiate pulse. A typical sequence of counter output pulses, where $n = 5$, is illustrated in FIG. $3F_1$. It will be appreciated that provision could be made that counter 40 be so set that $n$ is equal to any integral number. In FIG. $3F_1$, which illustrates the No. 1 count output of the ring counter 40, the first output gating pulse 73 is generated in response to the first count initiate pulse illustrated in FIG. 3E, which corresponds to the $C^-$ firing pulse of FIG. $3D_6$. The next counter output pulse 74 generated is that which is in response to the fifth occurring count initiate pulse after the first above mentioned gating pulse 73 which in turn corresponds to the $A^+$ firing pulse, and so forth. It will be appreciated that the counter 40 could be provided with other count outputs such as the counts No. 2 to No. 5, illustrated in FIG. $3F_2 - 3F_5$, respectively. In the train of counter output pulses of the count No. 2 output, illustrated in FIG. $3F_2$, for example, it is to be noted that the first counter output pulse is generated in response to the second count initiate pulse of FIG. 3E which corresponds to the $B^+$ firing pulse of FIG. $3D_2$. In the count No. 3 output of FIG. $3F_3$, the first pulse is generated in response to the third count initiate pulse of FIG. 3E which corresponds to the $A^-$ firing pulse of FIG. $3D_3$. Likewise in the count No. 4 and No. 5 outputs of FIGS. $3F_4$ and $3F_5$, the first gating pulses are generated in response to the fourth and fifth count initiate pulses, respectively, of FIG. 3E, which correspond to the $C^+$ and $B^-$ firing pulse, respectively of FIGS. $3D_2$ and $3D_5$. It will also be appreciated that the counter 40 can be so set that $n$ is equal to any integral number in the No. 2, No. 3, No. 4 and No. 5 counts.

The logic gating circuit 38 consists of a plurality of gate circuits 81–86 which generate the $A^+$, $B^+$, $C^+$, $A^-$, $B^-$ and $C^-$ trigger pulses illustrated in FIGS. $3G_1 - 3G_6$ in response to the firing pulses of circuit 34 and the output pulses of counter 40. Since gates 81–86 are similarly constructed only the details of gate 81 are illustrated and described.

Circuit 81 consists of a flip-flop circuit arrangement involving transistors 91 and 92, and a NAND gate circuit with transistor 93, and diodes 94 and 95. Transistors 91 and 92, both have their emitters connected to common and their collectors connected to the positive DC potential source through resistors 96 and 99, respectively. The base of transistor 91 is connected through a resistor 98 to the collector of transistor 92, and the base of transistor 92 is connected through a resistor 97 to the collector of transistor 91. The base of transistor 91 is also connected through diode 90 to common, and through diode 89 to the output of pulse generator 50 to receive the $B^+$ firing pulse. The base of transistor 92 connects through diode 87 to common and through diode 88 to the output of pulse generator 49 to receive the $A^+$ firing pulse. Diodes 87 and 90 prevent possible damaging reverse voltages on the base-emitter junctions of flip-flop transistors 91 and 92. Transistor 93 has its base connected to the positive voltage terminal of the DC voltage source through a resistor 100 and to common through resistor 102. Resistor 102 is used to minimize the possibility of electrical noise interference with the operation of transistor 93. The emitter of transistor 93 connects to common and its collector connects through a resistor 101 to the positive terminal of the potential source. A diode 94 connects the collector of transistor 92 to the base of transistor 93. A diode 95 connects the base of transistor 93 to the count No. 1 output terminal of ring counter 40.

As stated above, the $B^+$ firing pulse is not only applied to the diode 89 of circuit 81, but is also applied to the diode 88 of circuit 82. The $C^+$ firing pulse of generator 51 is applied to the diode 89 of circuit 82 and the diode 88 of circuit 83. The $A^-$ firing pulse is delivered both to the diode 88 of circuit 84 and the diode 89 of circuit 86. The $B^-$ firing pulse of circuit 53 is fed to the diode 89 of circuit 84 and the diode 88 of circuit 85. The $C^-$ firing pulse goes to the diode 89 of circuit 84 and diode 88 of circuit 86. The diode 89 of circuit 86 receives the $A^+$ firing pulse of circuit 49.

If a negative $A^+$ firing pulse is delivered through diode 88, transistor 92 will turn off because the base current through resistors 96 and 97 is diverted through diode 88. When transistor 92 turns off, transistor 91 will turn on with base drive current through resistors 98 and 99. Circuit 81 will remain in this condition until a negative $B^+$ firing pulse is delivered through diode 89 from circuit 50. Such a pulse will turn off transistor 91 and, subsequently, turn on transistor 92. While transistor 92 is on, current will flow through resistor 99 to common. In addition, current will flow through resistor 100 and diode 94 to common such that transistor 93 is off. While transistor 93 is off, resistor 101 maintains a positive potential on the collector of transistor 93. When an $A^+$ firing pulse turns transistor 92 off, current will flow through resistor 100 and turn on transistor 93 if this current is not diverted through diode 95 into the ring counter circuit 40. This, turn on of transistor 93 and the elimination of the potential on the collector is attempted upon the receipt of each $A^+$ firing pulse through diode 88. However, actual elimination of collector potential from transistor 93 occurs only if the ring counter 40 generates a positive pulse which reverse biases diode 95 at the same time that the $A^+$ firing pulse is received. This results in a series of $A^+$ trigger pulses, as illustrated in FIG. $3G_1$. Circuit 81 eliminates any attempt to remove the potential from the collector of transistor 93 whenever a $B^+$ firing pulse is received through the diode 89 from circuit 50.

Power amplifier circuit 42 consists of conventional inversion type signal amplifiers 103–108 which connect logic gates 81–83 to the terminals $A^+$, $B^+$, $C^+$, $A^-$, $B^-$, $C^-$, of thyristors 23, 25, 27, 24, 26, 28 for amplifying and inverting the $A^+$, $B^+$, $C^+$, $A^-$, $B^-$, $C^-$ trigger pulses applied thereto, respectively.

In operation, after time $T_3$, for example, just after generation of a $C^+$ firing pulse, as shown in FIG. $3D_3$, let it be assumed that in circuits 81, 82, 85 and 86 transistors 91 are off, and transistors 92 are on, while in circuits 83 and 84 transistors 91 are on, and transistors 92 are off.

At time $T_4$, a $B^-$ firing pulse, as illustrated in FIG. $3D_5$, is applied through diode 88 of circuit 85 such that transistor 92 turns off and transistor 91 turns on. Also, at the same time $T_4$, the $B^-$ firing pulse is applied through diode 89 of circuit 84 such that transistor 91 turns off and transistor 92 turns on.

At time $T_5$, an $A^+$ firing pulse, as illustrated in FIG. $3D_1$, is applied through diode 88 of circuit 81 such that transistor 92 turns off and transistor 91 turns on. Also, at time $T_5$ the $A^+$ firing pulse is applied to diode 89 of circuit 83 such that transistor 91 turns off and transistor 92 turns on. Simultaneously, at time $T_5$, counter 40 generates the pulse 74, as illustrated in FIG. $3F_1$, which has a duration lasting to time $T_6$, and is applied to the diodes 95 of all the circuits 81–86, which become reverse biased. Since circuits 81 and 85 are the only ones that have their transistors 92 turned off at time $T_5$ when the pulse 74 is generated by counter 40, the transistors 93 of these circuits are turned on, thus eliminating the voltages on their collectors, as illustrated in FIGS. $3G_1$ and $3G_5$. Simultaneously, in response thereto, inverting amplifiers 103 and 107 apply potentials to the terminals $A^+$ and $B^-$ of thyristors 23 and 26, respectively, which provides for current pulses 104 and 106 through loads 20 and 21, respectively, as shown in FIGS. $3H_1$ and 3H.

At time $T_6$ the pulse 74 is removed from diodes 95 of the circuits 81–86, and transistors 93 of circuits 81 and 85 are turned off, which again applies voltage on their collectors, and results in removal of the potentials from terminals $A^+$ and $B^-$ of thyristors 23 and 26. Also at time $T_6$ a $C^-$ firing pulse is applied through diode 88 of circuit 86 such that transistor 91 turns on. Simultaneously, the $C^-$ firing pulse is applied through diode 89 of circuit 85 such that transistor 91 turns off and transistor 92 turns on. Thus, now circuits 81 and 87 have their transistors 91 on and transistors 92 off, and the circuits 81–85 have transistors 91 off and transistors 92 on.

At time $T_7$, upon receipt of a $B^+$ firing pulse, circuits 81, 83, 84 and 85 have their transistors 91 turned off and transistors 92 turned on. Circuits 82 and 86 have transistors 91 turned on and transistors 92 turned off.

At time $T_8$ and $A^-$ firing pulse is generated and circuits 81, 83, 85 and 86 have transistors 91 turned off and transistors 92 turned on. Circuits 82 and 84 have transistors 91 on and transistors 92 off.

At time $T_9$ a $C^+$ firing pulse is generated and circuits 81, 82, 85 and 86 have transistors 91 turned off and transistors 92 on. Circuits 83 and 84 have transistors 91 turned on and transistors 92 turned off.

At $T_{10}$, a $B^-$ firing pulse is applied through diode 88 of circuit 85 such that transistor 92 turns off and transistor 91 turns on. Also, at time $T_{10}$ the $B^-$ firing pulse is applied to diode 89 of circuit 84 such that transistor 91 turns off and transistor 92 turns on. Simultaneously, at time $T_{10}$, counter 40 generates another pulse 107 which is applied to the diodes of all circuits 81–86, which become reverse biased. Since circuits 83 and 85 are the only ones that now have their transistors 92 turned off when the pulse 107 is generated by counter 40, the transistors 93 of these circuits are turned on, thus eliminating the voltages on their collectors as well as creating potentials on the $B^-$ and $C^+$ terminals of thyristors 26 and 27, respectively, with the providing of current pulses 108 and 110 through loads 21 and 22, respectively, as illustrated in FIGS. $3H_2$ and $3H_3$.

It will be apparent from the foregoing that when the next counter pulse 112 is generated by the counter 40, the potentials on terminals $C^+$ and $A^-$ of thyristors 27 and 24, respectively, will be generated and current pulses 114 and 116 passed through loads 22 and 20, respectively. Thus, the gating pulse 118 provides for actuation of terminals $A^-$ and $B^+$ of thyristors 24 and 25, respectively, with current pulses 120 and 122 passed through loads 20 and 21. Similarly, the pulse 124 provides for actuation of terminals $B^+$ and $C^-$ of thyristors 25 and 28, respectively, with current pulses 126 and 128 through loads 21 and 22. And finally, generation of pulse 130 provides the actuation of terminals $C^-$ and $A^+$ of thyristors 28 and 23, respectively, with current pulses 132 and 134 through loads 22 and 20, respectively. Upon generation of the next counter pulse 136, current pulses 138 and 140 are produced through loads 20 and 21, respectively, which are a repetition of the pulses 104 and 106, and the reduced frequency cycle begins again.

It will be appreciated that more than the one output count No. 1 of the ring counter 40 can be used as hereinbefore described. Utilization of the additional counts No. 2, No. 3, No. 4, and No. 5 would provide a plurality of trigger pulses during a single cycle of the counter 40. This can be accomplished by the addition of diodes such as the diodes 95 connected from diodes 94 to the appropriate ring counter 40 output counts.

While a specific embodiment of the invention has been illustrated and described, it is to be understood that it is provided by way of example only, and that the invention is not to be construed as being limited thereto, but only by the scope of the following claims.

What I claim is:

1. A control circuit for a thyristor line controller interconnecting an alternating current voltage generating source to a load comprising:
   a multi-winding transformer having a primary winding energized by the power source and secondary windings providing sinusoidal signals phased predetermined electrical degrees apart;
   potentiometer means for generating a negative potential DC firing angle command signal;
   a plurality of differential amplifiers each responsive to one of the sinusoidal signals and the firing angle command signal for generating a plurality of amplifier output signals;
   a plurality of circuit means each responsive to one of said amplifier output signals for generating firing pulses;
   a plurality of diodes each responsive to one of said firing pulses for generating count initiate pulses;
   a ring counter responsive to said count initiate pulses for generating a plurality of output counts, each of said counts including count pulses every nth initiate pulse;
   a plurality of flip-flop circuit means each responsive to a pair of said firing pulses for generating outputs; and
   a plurality of NAND circuit means each responsive to one of said flip-flop circuit means outputs and the count pulses of one of said counts for generating trigger pulses to the line controller thyristors.

2. A control circuit for a thyristor line controller interconnecting an alternating current voltage generating source to a load comprising:
   means for generating synchronizing signals corresponding to the frequency of generated voltage;
   means responsive to said synchronizing signals for generating firing signals;
   means responsive to said firing signals for generating count signals every nth firing signal; and
   logic gating means responsive to said firing signals and said count signals for generating trigger signals to actuate the thyristors to control the amount of alternating current electric power delivered to the load and reduce the fundamental frequency component to $f/n$, where $f$ is the frequency of generated voltage, and $n$ is an integral number.

3. The control circuit of claim 2 wherein said means for generating synchronizing signals comprises:
   a multi-winding transformer means having a primary winding energized by the power source and secondary windings providing sinusoidal signals phased predetermined electrical degrees apart.

4. The control circuit of claim 2 wherein said means for generating firing signals comprises:
   pulse generator means; and
   means for applying firing angle command signals to said pulse generator means to vary the power delivered to the load.

5. The control circuit of claim 2 wherein said means for generating count signals comprises:
   means responsive to the firing signals for generating count initiate signals; and
   counter means responsive to said count initiate signals for generating the count signals.

6. The control circuit of claim 4 wherein said pulse generator means comprises:

differential amplifier means; and circuit means responsive to said differential amplifier means output.

7. The control circuit of claim 4 wherein said means for applying firing angle command signals comprises:

potentiometer means for generating negative DC potentials.

8. The control circuit of claim 5 wherein said means for generating count initiate signals comprises:

a plurality of diode means having a common terminal.

9. The control circuit of claim 5 wherein said counter means for generating the count signals comprises:

a ring counter.

10. The control circuit of claim 2 wherein said logic gating means for generating the trigger signals comprises:

flip-flop circuit means; and

NAND gate circuit means responsive to said flip-flop circuit means output.

11. A method of reducing the fundamental frequency of alternating current voltage delivered to a load to $f/n$, when $f$ is the frequency of generated voltage and $n$ is an integral number;

said method comprising the steps of:

generating firing signals;

counting said firing signals;

generating a count signal every nth firing signal, and generating a trigger signal upon the concurrence of a firing signal and a count signal.

12. A control circuit for a thyristor controller interconnecting an alternating current voltage generating source to a multi-phase load, said circuit comprising:

transformer means for generating a plurality of synchronizing signals corresponding to the frequency of generated voltage and having a predetermined phase relationship;

means responsive to each of said synchronizing signals for generating firing signals;

means responsive to said firing signals for generating count signals every nth firing signal; and logic gating means operatively associated with each firing signal generating means responsive to the respective firing signals and said count signals for generating trigger signals to actuate the thyristors to control the amount of alternating current electric power delivered to the load and reduce the fundamental frequency component to $f/n$, where $f$ is the frequency of the generated voltage, and $n$ is an integral number.

13. The control circuit of claim 12 wherein said means for generating count signals comprises means responsive to the firing signals for generating count initiate signals, and counter means responsive to said count initiate signals generating the count signals.

14. The control circuit of claim 13 wherein said means for generating count initiate signals comprises a plurality of diode means each having a terminal connected to one of said firing signal generating means and a common terminal connected to said counter means.

* * * * *